(12) United States Patent
Ito

(10) Patent No.: US 10,783,538 B2
(45) Date of Patent: Sep. 22, 2020

(54) RELAY SERVER FOR A REWARD SYSTEM

(71) Applicant: TOSHIBA TEC KABUSHIKI KAISHA, Tokyo (JP)

(72) Inventor: Tadashi Ito, Kodaira Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 144 days.

(21) Appl. No.: 16/011,036

(22) Filed: Jun. 18, 2018

(65) Prior Publication Data

US 2019/0026764 A1     Jan. 24, 2019

(30) Foreign Application Priority Data

Jul. 21, 2017     (JP) .................................. 2017-142077

(51) Int. Cl.
*G06Q 30/00*     (2012.01)
*G06Q 30/02*     (2012.01)
(Continued)

(52) U.S. Cl.
CPC ....... *G06Q 30/0213* (2013.01); *G06F 16/122* (2019.01); *G06Q 20/027* (2013.01);
(Continued)

(58) Field of Classification Search
CPC ............. G06Q 30/0213; G06Q 20/202; G06Q 20/387; G06Q 20/027; G06Q 30/0238;
(Continued)

(56) References Cited

U.S. PATENT DOCUMENTS 7,353,208 B1     4/2008 Stambaugh
2007/0073587 A1     3/2007 Walker et al.
(Continued)

FOREIGN PATENT DOCUMENTS

JP     H10-240651 A     9/1998
WO     2005/008552 A1     1/2005

OTHER PUBLICATIONS

"Pervasive computing technologies for retail in-store shopping". (Year: 2005).*
(Continued)

*Primary Examiner* — Maria V Vanderhorst
(74) *Attorney, Agent, or Firm* — Kim & Stewart LLP (57) ABSTRACT

A relay server applies rewards in a rewards system that includes the relay server, a point of sale terminal, and a reward management server. The relay server includes a storage device, a communication interface, and a processor. The communication interface receives an update request for updating an accumulated reward provided to a customer, and transmits, to the reward management server, the update request. The storage device stores update request data indicating the update request was transmitted to the reward management server. The communication interface receives a reward updated result indicating that the accumulated reward provided to the customer was updated. When the reward updated result is not received within a predetermined time, the communication interface transmits, to the point of sale terminal, a reward update pending result indicating that the update request is pending.

20 Claims, 7 Drawing Sheets

(51) Int. Cl.
  *G07G 1/00* (2006.01)
  *G06Q 20/02* (2012.01)
  *G06Q 20/38* (2012.01)
  *G06Q 20/20* (2012.01)
  *G06F 16/11* (2019.01)
  *G05B 19/418* (2006.01)

(52) U.S. Cl.
  CPC ......... *G06Q 20/202* (2013.01); *G06Q 20/387* (2013.01); *G06Q 30/0207* (2013.01); *G06Q 30/0224* (2013.01); *G06Q 30/0238* (2013.01); *G07G 1/0009* (2013.01)

(58) Field of Classification Search
  CPC . G06Q 30/0224; G07G 1/0009; G06F 16/122
  See application file for complete search history.

(56) References Cited

U.S. PATENT DOCUMENTS

| | | | |
|---|---|---|---|
| 2010/0057611 A1* | 3/2010 | Antoo | G06Q 20/10 705/39 |
| 2012/0136739 A1 | 5/2012 | Chung | |
| 2014/0278893 A1* | 9/2014 | Houlihan | G06Q 30/0227 705/14.28 |
| 2016/0012467 A1* | 1/2016 | Nakai | G06Q 30/0217 705/14.19 |
| 2016/0275474 A1* | 9/2016 | Kim | G06Q 20/227 |
| 2017/0344964 A1* | 11/2017 | Garlick | G06Q 20/027 |

OTHER PUBLICATIONS

Extended European Search Report dated Oct. 5, 2018 in corresponding European Patent Application No. 18184097.6, 9 pages.

* cited by examiner

RELAY SERVER FOR A REWARD SYSTEM

CROSS-REFERENCE TO RELATED APPLICATION

This application is based upon and claims the benefit of priority from Japanese Patent Application No. 2017-142077, filed Jul. 21, 2017, the entire contents of which are incorporated herein by reference.

FIELD

Embodiments described herein relate generally to a relay server for a reward system.

BACKGROUND

In a retail store such as a supermarket, a reward system provides a reward service for providing a reward, such as points, based on an amount of shopping. Such a reward system includes a server device which stores the rewards such as points earned by each customer.

An information processing apparatus such as a POS (Point Of Sales) terminal transmits the earned points to the server device when a customer finishes shopping. When the server device receives the points, the server device transmits a reply that the accumulated point amount is updated. In this way, an operator who operates the information processing apparatus can confirm that the points are updated in the server device.

On the other hand, the information processing apparatus displays a message indicating that the accumulated point amount is not updated if there is no reply that the points are updated, and requests the operator to perform an operation to update the accumulated point amount again. The operator inputs the operation of updating the point amount again and transmits the earned points to the server device. As described above, the operator has to input the operation for updating the points again if there is no reply regarding the completion of the update, which is troublesome.

DETAILED DESCRIPTION

According to an embodiment, a relay server applies rewards in a rewards system that includes the relay server, a point of sale terminal, and a reward management server. The relay server includes a storage device, a communication interface, and a processor programmed according to a control program. The communication interface receives, from the point of sale terminal, an update request for updating an accumulated reward provided to a customer. The processor controls the communication interface to transmit, to the reward management server, the update request, and controls the storage device to store update request data indicating the update request was transmitted to the reward management server. The communication interface receives, from the reward management server, a reward updated result indicating that the accumulated reward provided to the customer was updated in response to the update request. When the reward updated result is received, the storage device stores, in correspondence with the updated request data, reward updated data indicating the reward updated result was received from the reward management server, and the communication interface transmits, to the point of sale terminal, the reward updated result. When the reward updated result is not received within a predetermined time, the processor controls the communication interface to transmit, to the point of sale terminal, a reward update pending result indicating that the update request is pending.

An embodiment of a point of sale apparatus for applying rewards, a reward system and a related method will be described below in detail with reference to the accompanying drawings. The embodiment described below is an embodiment of the point of sale apparatus, the reward system, and the related method, and is not intended to limit the configuration, the specification, and the like thereof. According to the present embodiment, the point of sale apparatus can be used, for example, in the reward system which provides rewards such as points based on an amount of shopping, using a relay server.

Figure 1:
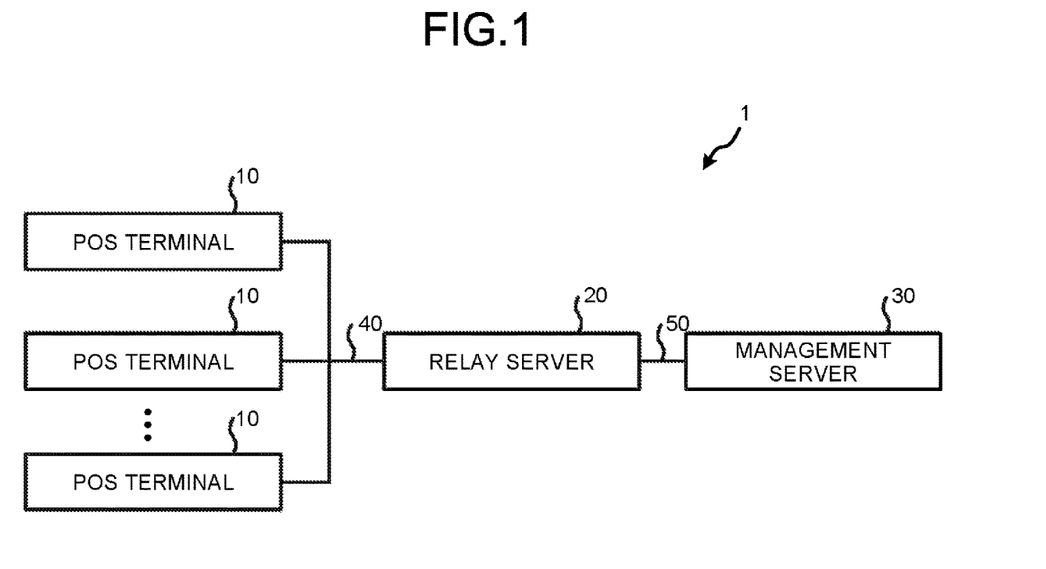
FIG. 1 is a diagram illustrating an example of a reward system according to an embodiment.

FIG. 1 is a diagram illustrating an example of a reward system 1 according to the present embodiment. The reward system 1 comprises a POS (Point of Sales) terminal 10, a relay server 20, and a management server 30. The POS terminal 10 and the relay server 20 are connected with each other via a first network 40 such as an Internet or a VPN (Virtual Private Network). The relay server 20 and the management server 30 are connected with each other via a second network 50 such as the Internet or VPN. In the reward system 1 shown in FIG. 1, a plurality of POS terminals 10, one relay server 20 and one management server 30 are shown, but the number of respective devices is arbitrary. The reward system 1 may further include a device (not shown) such as a store server for managing the POS terminal 10 installed in a retail store between the POS terminal 10 and the relay server 20. The reward system 1 may further include an arbitrary device (not shown) between the relay server 20 and the management server 30.

The POS terminal 10 is a sales data processing apparatus that executes a sales registration process of registering a commodity to be sold and a checkout process for executing checkout of commodities registered by the sales registration process. The POS terminal 10 receives an input of a customer code which is identification information for of identifying a customer who uses a reward service for providing rewards such as points that are earned based on the amount of shopping. Further, the POS terminal 10 outputs earned points by displaying, printing or the like.

The relay server 20 relays communication between the POS terminal 10 and the management server 30. For example, if the relay server 20 receives an inquiry request from the POS terminal 10, the relay server 20 transmits the inquiry request to the management server 30. Then, if the relay server 20 receives an inquiry result from the management server 30, the relay server 20 transmits the inquiry result to the POS terminal 10. When receiving a rewards update request from the POS terminal 10, the relay server 20 transmits a rewards update request to the management server 30. Then, if the relay server 20 receives a rewards update result from the management server 30, the relay server 20 transmits the rewards update result to the POS terminal 10.

The management server 30 is the server device which manages a reward service for providing points that are earned based on the amount of shopping. For example, if receiving the inquiry request, the management server 30 makes a customer inquiry. The management server 30 carries out an update for adding points if a customer purchases a commodity. Then, the management server 30 executes an update for subtracting points if the customer purchases a commodity using points.

There is a case in which the relay server 20 cannot receive the updating result even if the update request is transmitted due to an abnormality of the second network 50, an abnormality of the management server 30, a power failure, or the like. The relay server 20 can receive the update result by retransmitting the update result if these abnormalities or outages temporarily occur. Thus, the relay server 20 retransmits the update result if no update result is received.

Next, the hardware configuration of various devices provided in the reward system 1 is described.

Figure 2:
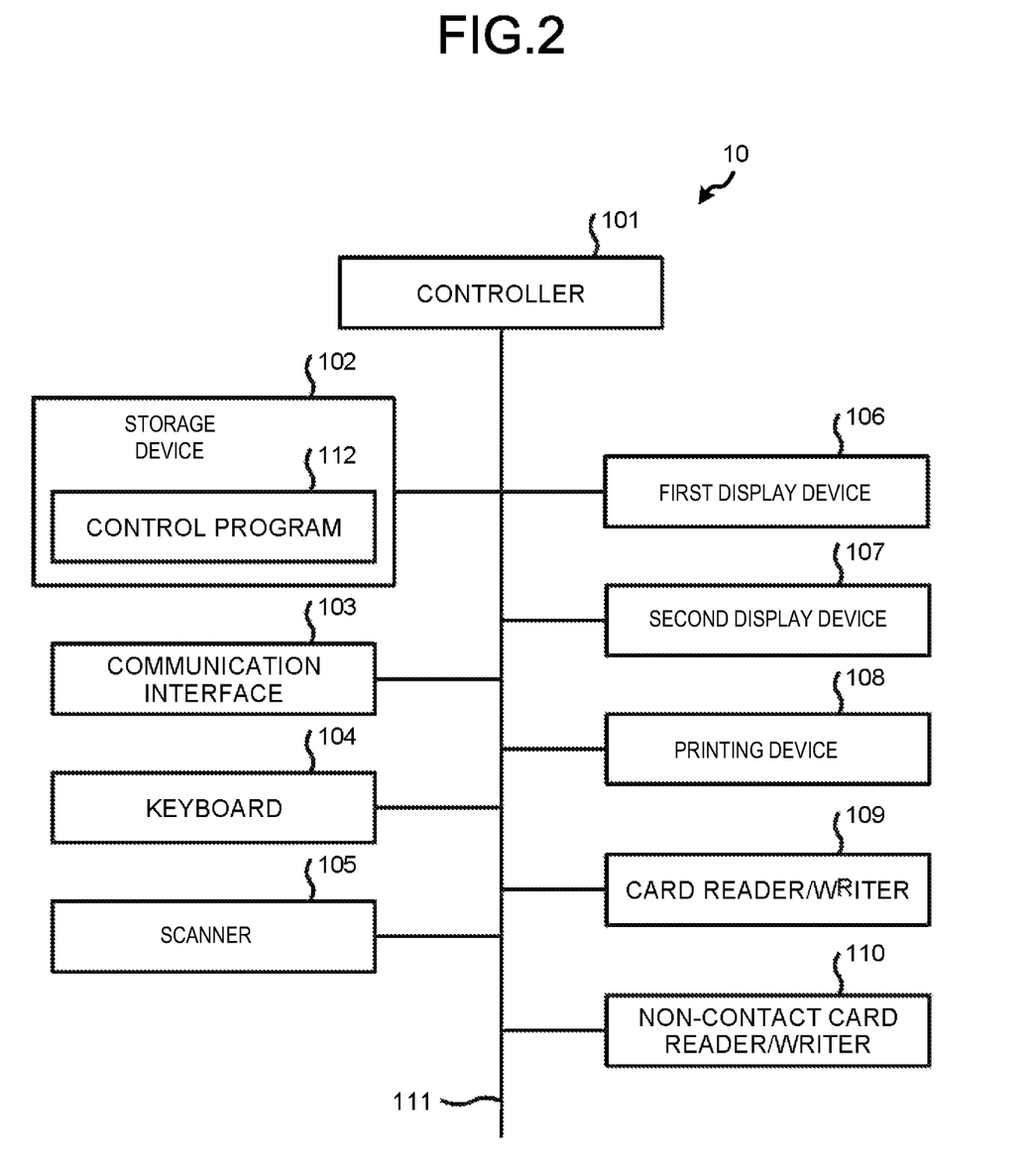
FIG. 2 is a block diagram illustrating an example configuration of a POS terminal in the reward system.

FIG. 2 is a block diagram illustrating an example configuration of the POS terminal 10. The POS terminal 10 includes a controller 101, a storage device 102, a communication interface 103, a keyboard 104, a scanner 105, a first display device 106, a second display device 107, a printing device 108, a card reader/writer 109, and a non-contact card reader/writer 110. These components are connected with each other via a system bus 111 such as a data bus and an address bus.

The controller 101 is a computer that controls the overall operation of the POS terminal 10 to realize various functions of the POS terminal 10. The controller 101 includes a CPU (Central Processing Unit), a ROM (Read Only Memory), and a RAM (Random Access Memory). The CPU collectively controls the operation of the POS terminal 10. The ROM stores various programs and data. The RAM temporarily stores various programs and various data. Then, the CPU executes programs stored in the ROM or the storage device 102 by using the RAM as a work area (working area).

The storage device 102 is a HDD (Hard Disk Drive), a SSD (Solid State Drive) or the like. The storage device 102 stores a control program 112. The control program 112 is used for realizing an operating system and the functions of the POS terminal 10. The control program 112 includes a program for realizing the characteristic functions according to the present embodiment.

The communication interface 103 is used for communicating with the relay server 20 connected to the first network 40.

The keyboard 104 includes various keys for operating the POS terminal 10.

The scanner 105 reads the information indicated by a code symbol. For example, the scanner 105 reads a commodity code which is the identification information capable of identifying a commodity.

The first display device 106 is a liquid crystal display with a touch-sensitive display surface. The first display device 106 displays various screens for a store clerk in the retail store, for example. The second display device 107 is a liquid crystal display with a touch-sensitive display surface. For example, the second display device 107 displays various screens for a customer.

The printing device 108 prints a receipt showing transaction details, point status, and the like on a sheet.

The card reader/writer 109 reads and writes information stored in a storage medium such as a magnetic material attached to a card. The non-contact card reader/writer 110 writes and reads the information to and from an IC tag on a non-contact IC card by wireless communication such as NFC (Near Field Communication).

Figure 3:
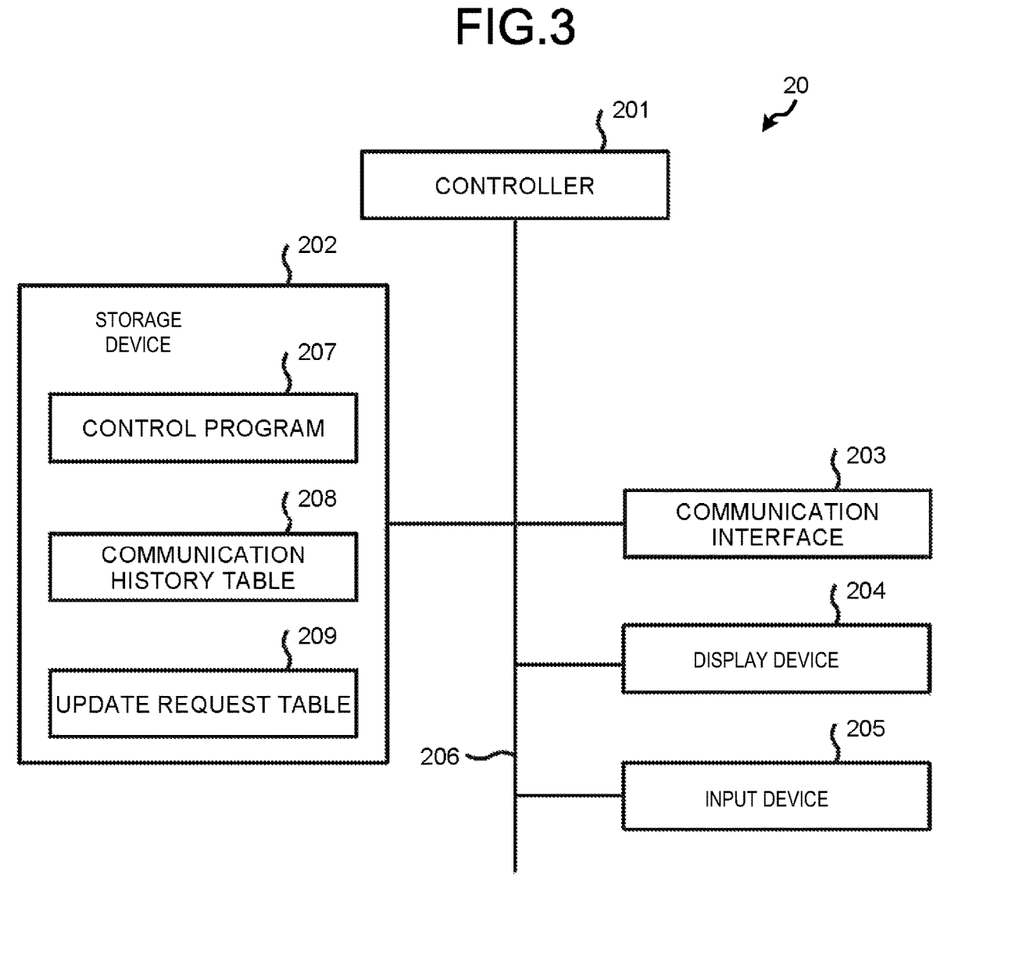
FIG. 3 is a block diagram illustrating an example configuration of a relay server in the reward system.

FIG. 3 is a block diagram illustrating an example of hardware configuration of the relay server 20. The relay server includes a controller 201, a storage device 202, a communication interface 203, a display device 204, and an input device 205. These devices are connected with each other via a system bus 206 such as a data bus and an address bus.

The controller 201 is a computer that controls the overall operation of the relay server 20 to realize various functions of the relay server 20. The controller 201 includes a CPU, a ROM, and a RAM. The CPU collectively controls the operation of the relay server 20. The ROM stores various programs and data. The RAM temporarily stores various programs and various data. Then, the CPU executes programs stored in the ROM or the storage device 202 by using the RAM as a work area (working area).

The storage device 202 is a HDD, a SSD or the like. The storage device 202 stores a control program 207, a communication history table 208, and an update request table 209. The communication history table 208 and the update request table 209 may be stored in another device.

The control program 207 is used for realizing an operating system and the functions of the relay server 20. The control program 207 includes a program for realizing the characteristic functions according to the present embodiment.

Figure 4:
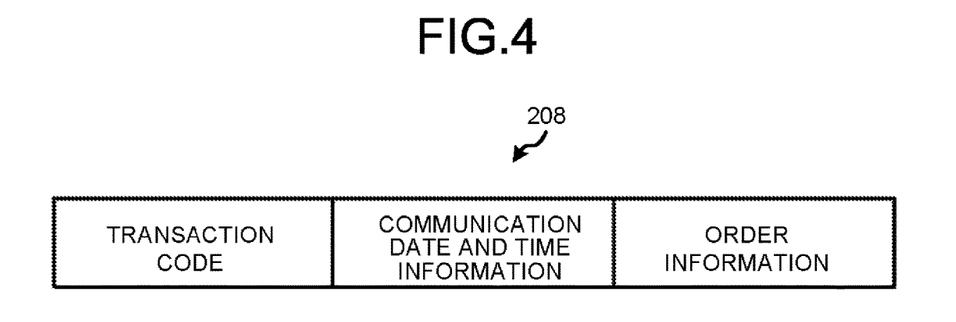
FIG. 4 is illustrates an example data structure of a communication history table.

FIG. 4 is a diagram illustrating an example data structure of the communication history table 208. Here, the relay server 20 updates the rewards by communicating with the management server 30 in a predefined order. The relay server 20 can identify the current order by recording the communication with the management server 30. That is, the relay server 20 stores a history of communication with the management server 30.

The communication history table 208 stores a history of communication with the management server 30 in the reward service for each transaction. The communication history table 208 stores a transaction code, communication date and time information, and order information in association with each other. The transaction code is used for identifying a transaction. The communication date and time information indicates date and time when the communication is executed. The order information indicates a sequence order of communication. The following orders included in the order information are merely an example, and an order not described below may be included:

First: transmit an inquiry request regarding a customer.
Second: receive the inquiry result for the inquiry request.
Third: transmit an update request for requesting an update of points.
Fourth: receive the update result for the update request.

The update request table 209 stores the update request received from the POS terminal 10.

The communication interface 203 is used for communicating with the POS terminal 10 via the first network 40. The communication interface 203 is also used for communicating with the management server 30 via the second network 50.

The display device 204 is, for example, a liquid crystal display. The input device 205 is, for example, an input device such as a keyboard or a mouse. The relay server 20 may include a touch panel display in which the display device 204 and the input device 205 are integrated.

Figure 5:
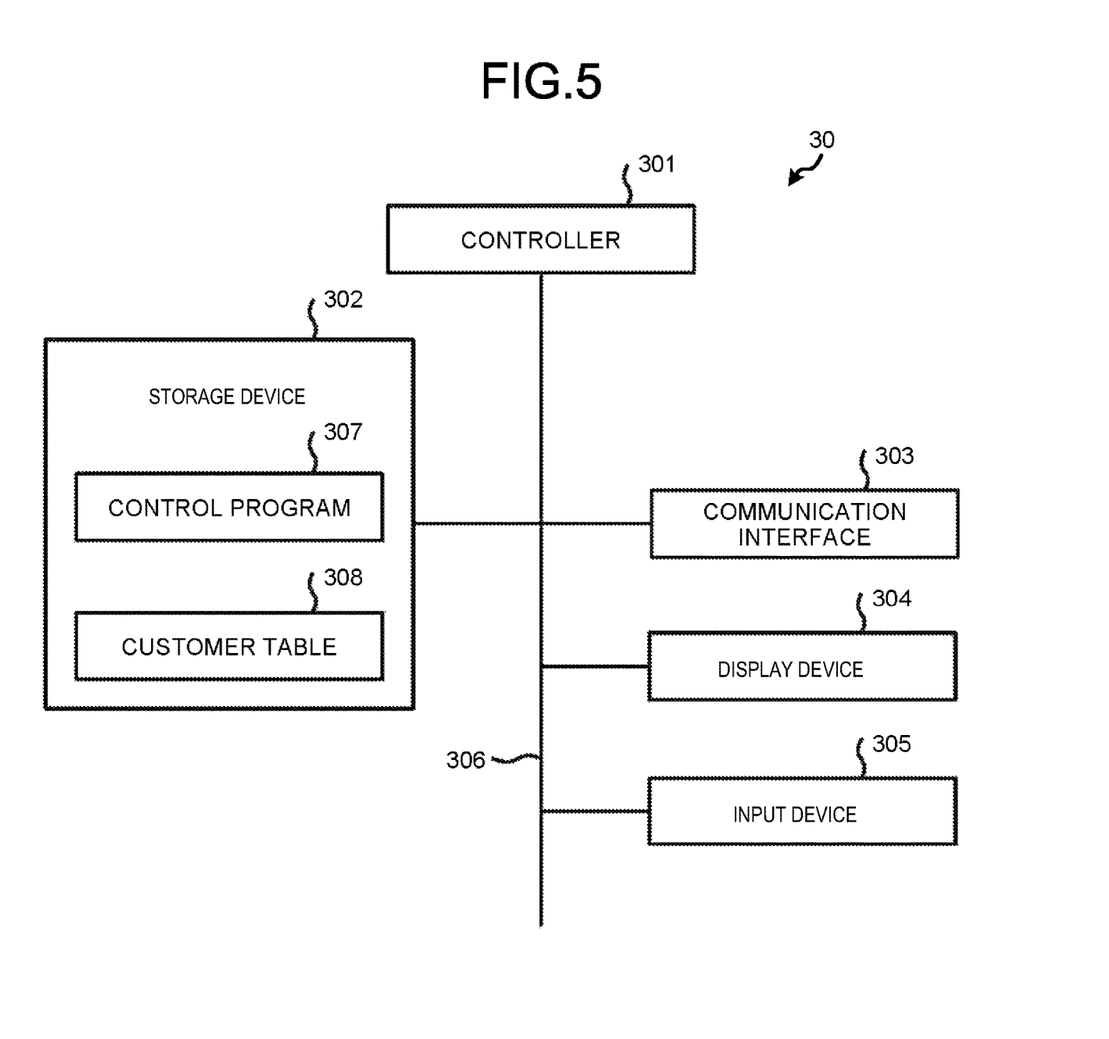
FIG. 5 is a block diagram illustrating an example configuration of a management server.

FIG. 5 is a block diagram illustrating an example configuration of the management server 30. The management server 30 includes a controller 301, a storage device 302, a communication interface 303, a display device 304, and an input device 305. These devices are connected with each other via a system bus 306 such as a data bus, or an address bus.

The controller 301 is a computer that controls the overall operation of the management server 30 to realize various functions of the management server 30. The controller 301 includes a CPU, a ROM, and a RAM. The CPU collectively controls the operation of the management server 30. The ROM stores various programs and data. The RAM temporarily stores various programs and various data. Then, the CPU executes a program stored in the ROM or the storage device 302 by using the RAM as a work area (working area).

The storage device 302 is a HDD, a SSD or the like. The storage device 302 stores a control program 307 and a customer table 308. The customer table 308 may be stored in another device.

The control program 307 is used for realizing an operating system and the functions of the management server 30. The control program 307 includes a program for realizing the characteristic functions according to the present embodiment.

Figure 6:
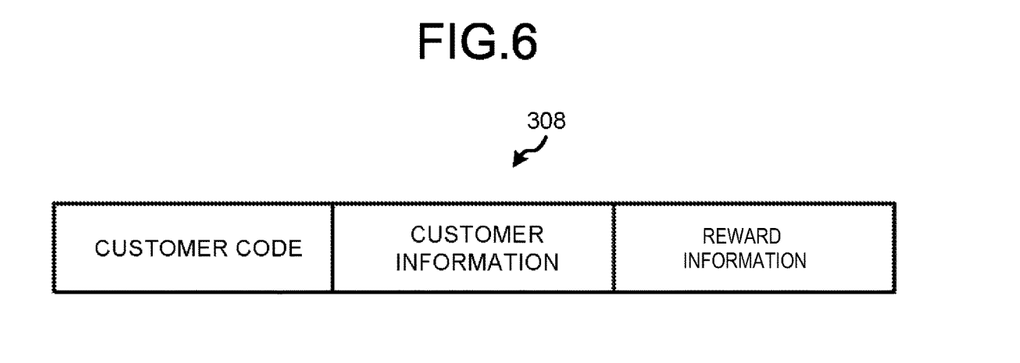
FIG. 6 illustrates an example data structure of a customer table.

FIG. 6 illustrates an example data structure of the customer table 308. The customer table 308 stores information relating to a customer who uses the reward service. The customer table 308 stores a customer code, customer information, and reward information in association with each other. The customer code is used for identifying a customer. The customer information includes a name, an age, a sex and the like of the customer. The reward information indicates a reward provided to the customer. For example, the reward information indicates cumulative values of points or the like.

The communication interface 303 is used for communicating with the relay server 20 via the second network 50.

The display device 304 is, for example, a liquid crystal display. The input device 305 is an input device such as a keyboard and a mouse, for example. The management server 30 may include a touch panel display in which the display device 304 and the input device 305 are integrated.

Figure 7:
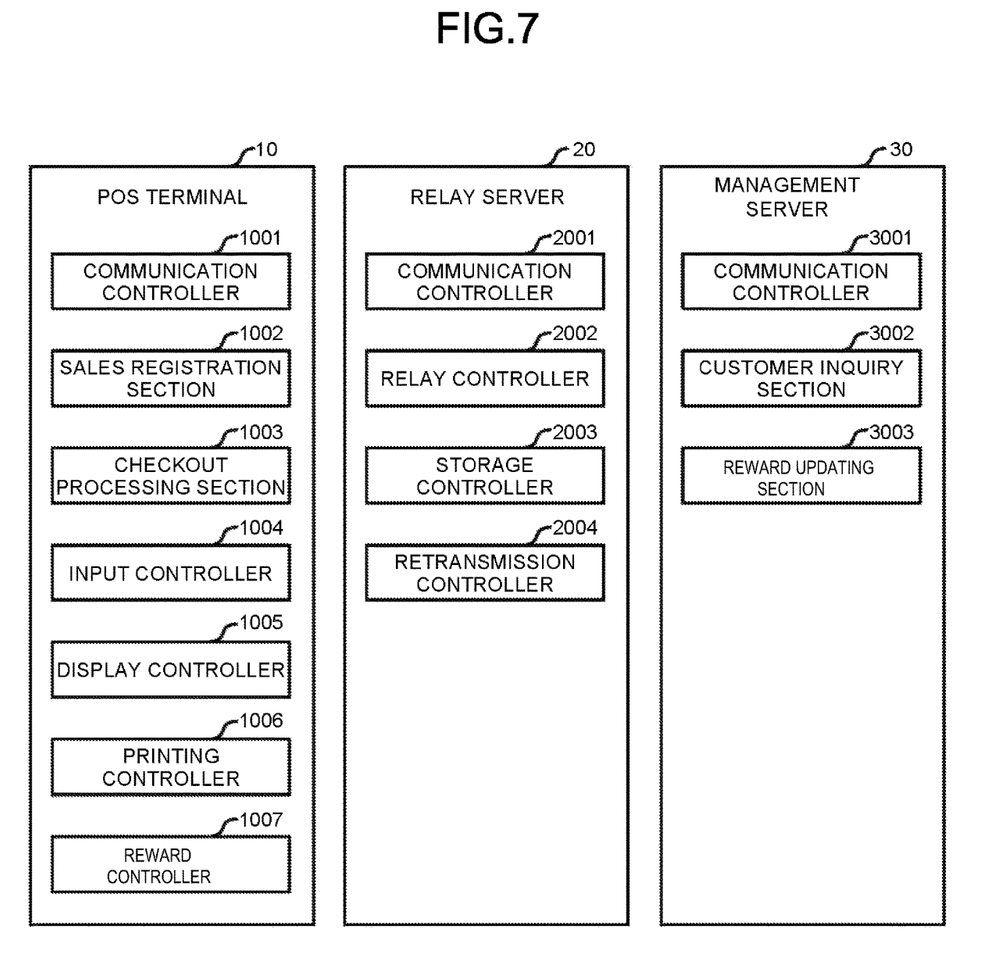
FIG. 7 is a block diagram illustrating example functional sections of respective components provided in the reward system.

Next, the characteristic functions of respective devices of the reward system 1 are described. FIG. 7 is a block diagram illustrating an example of functional sections of respective components provided in the reward system 1.

The controller 101 of the POS terminal 10 copies or decompresses the control program 112 in the storage device 102 on the RAM and executes the control program. 112 to generate each functional section shown in FIG. 7 on the RAM. Specifically, as the functional sections, the controller 101 of the POS terminal 10 includes a communication controller 1001, a sales registration section 1002, a checkout processing section 1003, an input controller 1004, a display controller 1005, a printing controller 1006, and a reward controller 1007.

The communication controller 1001 controls the communication interface 103 to perform communication via the first network 40. For example, the communication controller 1001 communicates with the relay server 20.

The sales registration section 1002 controls sales registration for registering a commodity to be sold to the customer. For example, the sales registration section 1002 performs sales registration on a commodity identified by the commodity code read from a code symbol by the scanner 105.

The checkout processing section 1003 controls a checkout process with respect to the commodity subjected to the sales registration by the sales registration section 1002. For example, the checkout processing section 1003 calculates a change by subtracting a total amount from an amount received from the customer.

The input controller 1004 controls the scanner 105 to receive an input of the customer code. The input controller 1004 may also control the keyboard 104, the card reader/writer 109, or the non-contact card reader/writer 110 in addition to the scanner 105 to receive the input of the customer code.

The display controller 1005 controls the first display device 106 and the second display device 107 to display various screens.

The printing controller 1006 controls the printing device 108 to print various information on a sheet.

The reward controller 1007 controls a process of providing a reward to a customer. The reward controller 1007 cooperates with the communication controller 1001 to transmit an inquiry for requesting the rewards provided to the customer identified by the customer code if the input controller 1004 receives the input of the customer code. The inquiry contains the customer code of the customer who is an inquiry target. The reward controller 1007 cooperates with the communication controller 1001 to receive a response to the inquiry. The response to the inquiry includes the customer information and the reward information.

The reward controller 1007 cooperates with the communication controller 1001 to transmit an update request to update the reward information in the customer table 308. The reward controller 1007 performs control to transmit the update request to add a reward such as points in response to a sales amount if the commodity is sold in the transaction. On the other hand, the reward controller 1007 performs control to transmit the update request for requesting subtraction of a reward such as points if the reward such as points is used in a transaction. For example, the update request includes a transaction code, a customer code, and update content. The transaction code indicates a target transaction. The customer code indicates a customer whose reward is to be updated. The update content may be a point value to be added or subtracted, a sales amount or a used point value.

If the updating result is received, the reward controller 1007 enables the display controller 1005 to display the updating result. If the updating result is received, the reward controller 1007 enables the printing controller 1006 to print the updating result. More specifically, the reward controller 1007 displays or prints the reward total before the update, the reward total after the update, and an reward amount provided due to the transaction.

If no updating result is received from the management server 30, provisionally, the relay server 20 transmits an updating result indicating that updating of the reward is not completed to the POS terminal 10. The relay server 20 then transmits the update request again to the management server 30 after transmitting the updating result indicating that updating of the reward is not completed. The reward controller 1007 displays or prints a message indicating that the reward is scheduled to be updated if the updating result is received indicating that the updating of the reward is not completed. For example, the reward controller 1007 displays or prints a currently provided reward, a reward scheduled to be updated, and a reward to be provided. The reward controller 1007 displays or prints a message indicating that the reward is scheduled to be provided.

The controller 201 of the relay server 20 copies or decompresses the control program 207 in the storage device 202 on the RAM and executes the control program 207 to generate each functional section shown in FIG. 7 on the RAM. Specifically, the controller 201 of the relay server 20 includes a communication controller 2001, a relay controller 2002, a storage controller 2003, and a retransmission controller 2004 as functional sections.

The communication controller 2001 is an example of an input module, a transmission module, a reception module, and an output module. The communication controller 2001 controls the communication interface 203 to perform communication via the first network 40 and the second network 50. For example, the communication controller 2001 executes communication with the POS terminal 10 and the management server 30.

The relay controller 2002 relays communication between the POS terminal 10 and the management server 30 in cooperation with the communication controller 2001. For example, if the inquiry request is received from the POS terminal 10, the relay controller 2002 transmits the inquiry request to the management server 30. If the inquiry result is received from the management server 30, the relay controller 2002 transmits the inquiry result to the POS terminal 10.

If the update request is received from the POS terminal 10, the relay controller 2002 transmits the update request to the management server 30. If the updating result is received from the management server 30, the relay controller 2002 transmits the updating result to the POS terminal 10.

Furthermore, the relay controller 2002 transmits the updating result indicating that the updating of the reward is not completed if a transmission condition under which the updating result is transmitted is satisfied, even if the updating result is not received from the management server 30. The transmission condition may be set arbitrarily. For example, the transmission condition refers to elapse of a predetermined period of time since the update request is transmitted.

The storage controller 2003 is an example of a storage control module. The storage controller 2003 stores the communication history in the communication history table 208. For example, if the inquiry request and the update request are transmitted to the management server 30, the storage controller 2003 stores the communication history in the communication history table 208. The storage controller 2003 stores the communication history in the communication history table 208 if the inquiry result and the updating result are received from the management server 30. If the update request is transmitted to the management server 30, the storage controller 2003 stores the transmitted update request in the update request table 209.

The retransmission controller 2004 is an example of an extraction module, a retransmission module, and an exclusion module. The retransmission controller 2004 controls the retransmission of the update request stored in the communication history table 208. The retransmission controller 2004 determines whether or not a retransmission condition for retransmitting the update request is satisfied. The retransmission condition may be arbitrarily set. For example, the retransmission condition may be every time a predetermined time elapses since the last update request is transmitted, or may be a predetermined time or a condition that the update request for retransmission is stored in the communication history table 208.

The retransmission controller 2004 extracts the transaction code for which no updating result is received from the communication history table 208 if the retransmission condition is satisfied. Specifically, the communication history of the update request is stored in the communication history table 208 but the communication history of the updating result is not stored therein, the retransmission controller 2004 extracts the transaction code. The retransmission controller 2004 extracts the update request corresponding to the extracted transaction code from the update request table 209. The retransmission controller 2004 performs control to retransmit the update request to the communication controller 2001.

The retransmission controller 2004 excludes the update request that satisfies a predetermined condition from the retransmission target. The predetermined condition is, for example, that the update request is retransmitted a predetermined number of times or more, or that a predetermined time elapses since the first transmission of the update request. In such a case, as there is a high possibility that a problem has occurred, even if the update request is retransmitted, the updating result is unlikely to be transmitted. Therefore, the retransmission controller 2004 excludes the update request satisfying the condition from the retransmission target and does not retransmit the update request. Then, it is possible to reduce unnecessary communication for the update request satisfying the condition by updating the reward by an administrator of the reward system 1.

The controller 301 of the management server 30 copies or decompresses the control program 307 in the storage device 302 on the RAM and executes the control program 307 to generate each functional section shown in FIG. 7 on the RAM. Specifically, the controller 301 of the management server 30 includes a communication controller 3001, a customer inquiry section 3002, and a reward updating section 3003 as functional sections.

The communication controller 3001 controls the communication interface 303 to execute communication via the second network 50. For example, the communication controller 3001 performs communication with the relay server 20.

The customer inquiry section 3002 determines whether or not the customer code included in the inquiry request is stored in the customer table 308 when the communication controller 3001 receives the inquiry request. The customer inquiry section 3002 extracts the customer information and the reward information associated with the customer code from the customer table 308 if the customer code is stored in the customer table 308. The customer inquiry section 3002 then transmits the inquiry result including the extracted customer information and reward information to the communication controller 3001.

If the communication controller 3001 receives the update request, the reward updating section 3003 updates the reward information associated with the customer code included in the update request based on the update content included in the update request. Then, the reward updating section 3003 enables the communication controller 3001 to transmit the updating result indicating that the reward total is updated based on the update request. The updating result contains the updated reward information.

Figure 8:
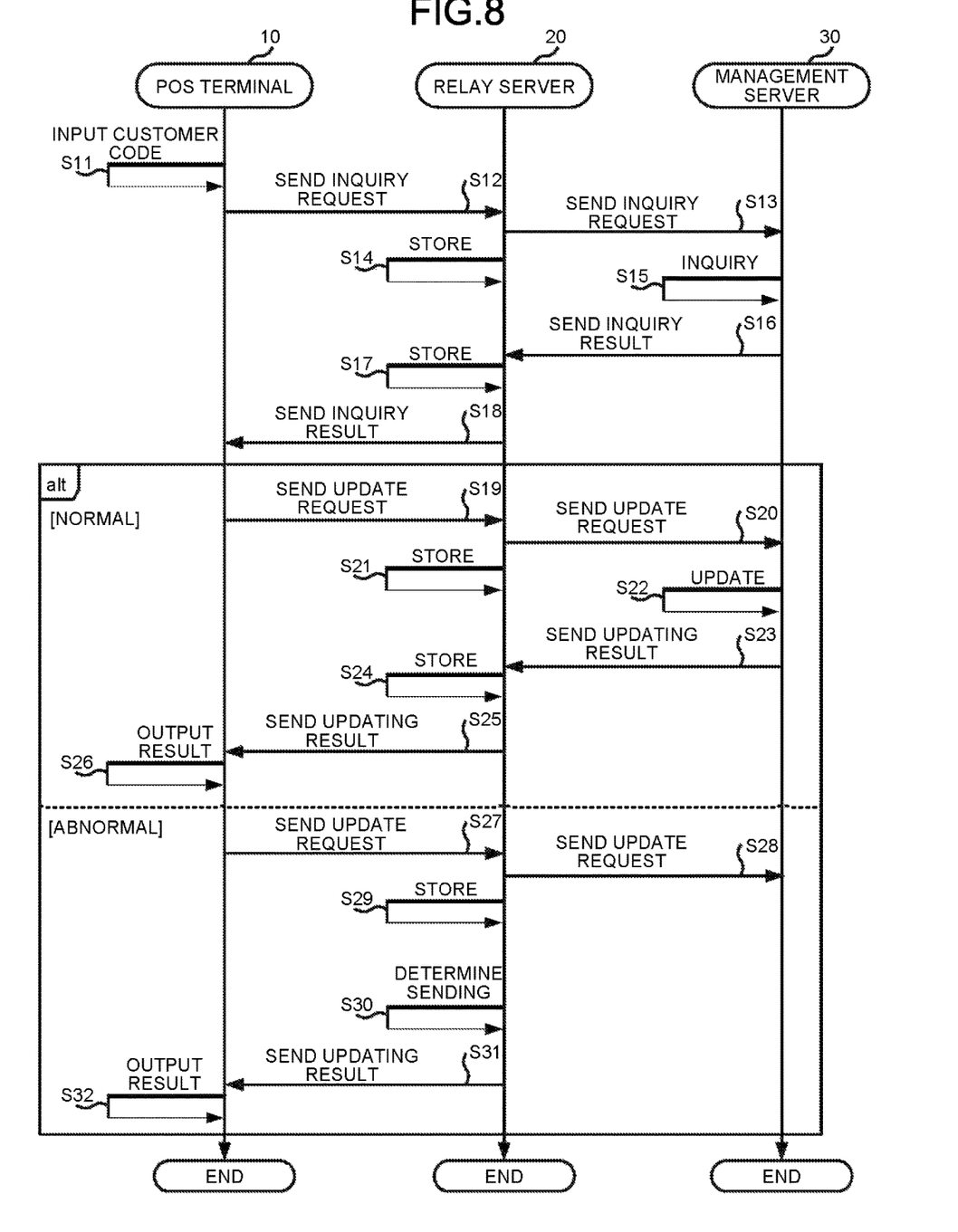
FIG. 8 is a flowchart depicting a reward updating process.

Next, the reward updating process executed by each device of the reward system 1 is described. FIG. 8 is a flowchart depicting a reward updating process executed by respective devices of the reward system 1 according to the present embodiment.

The input controller 1004 of the POS terminal 10 receives an input of a customer code of a customer who receives the reward in one transaction (Act S11). The communication controller 1001 of the POS terminal 10 transmits the inquiry request for requesting inquiry of the reward provided to the customer identified by the input customer code (Act S12).

The communication controller 2001 of the relay server 20 transmits the inquiry request to the management server 30 if the inquiry request is received (Act S13). The storage controller 2003 of the relay server 20 also stores, in the communication history table 208, data indicating that the inquiry request is transmitted (Act S14). Specifically, the storage controller 2003 stores a transaction code, communication date and time information indicating the transmission date and time, and order information indicating the order 1.

The customer inquiry section 3002 of the management server 30 determines the accumulated reward provided to the customer identified by the customer code included in the received inquiry request (Act S15). The communication controller 3001 of the management server 30 transmits the inquiry result to the relay server 20 (Act S16).

The storage controller 2003 of the relay server 20 stores, in the communication history table 208, data indicating that the inquiry result is received (Act S17). Specifically, the storage controller 2003 stores the transaction code, the communication date and time information indicating reception date and time, and the order information indicating the order 2.

The communication controller 2001 of the relay server 20 transmits the received inquiry result to the POS terminal 10 (Act S18).

A case in which the updating of the reward information in the customer table 308 is executed normally is described in Act S19 to Act S26.

The communication controller 1001 of the POS terminal 10 transmits the update request for requesting updating of the reward information (Act S19).

The communication controller 2001 of the relay server 20 transmits the update request to the management server 30 if the update request is received (Act S20). The storage controller 2003 of the relay server 20 stores data indicating that the update request is transmitted in the communication history table 208, and stores the transmitted update request in the update request table 209 (Act S21). Specifically, the storage controller 2003 stores the transaction code, the communication date and time information indicating transmission date and time, and the order information indicating order 3.

The reward updating section 3003 of the management server 30 updates the reward information associated with the customer code designated by the received update request (Act S22). For example, the reward updating section 3003 adds the points corresponding to a value designated by the update request if the update request indicates addition of the reward information. Likewise, the reward updating section 3003 subtracts the points corresponding to a value designated by the update request if the update request indicates subtraction of the reward information.

The communication controller 3001 of the management server 30 transmits the updating result to the relay server 20 (Act S23). For example, the communication controller 3001 transmits data indicating that updating is performed normally as the updating result.

The storage controller 2003 of the relay server 20 stores data indicating that the updating result is received in the communication history table 208 (Act S24). Specifically, the storage controller 2003 stores the transaction code, the communication date and time information indicating reception date and time, and the order information indicating order 4.

The communication controller 2001 of the relay server 20 transmits the received updating result to the POS terminal 10 (Act S25).

The display controller 1005 and the printing controller 1006 of the POS terminal 10 output the updating result (Act S26). Specifically, the display controller 1005 of the POS terminal 10 displays a screen including the updating result on the first display device 106 and the second display device 107. The printing controller 1006 of the POS terminal 10 controls the printing device 108 to print information including the updating result.

A case in which the updating result indicating that the reward information in the customer table 308 is updated is not received is described in Act S27 to Act S32.

The communication controller 1001 of the POS terminal 10 transmits the update request for requesting updating of the reward information (Act S27).

The communication controller 2001 of the relay server 20 transmits the update request to the management server 30 if the update request is received (Act S28). The storage controller 2003 of the relay server 20 stores data indicating that the update request is transmitted in the communication history table 208, and stores the transmitted update request in the update request table 209 (Act S29). Specifically, the storage controller 2003 stores the transaction code, the communication date and time information indicating the transmission date and time, and the order information indicating the order 3 in the communication history table 208.

Since an abnormality occurs, the management server 30 does not update the reward information. Likewise, the management server 30 does not transmit the updating result.

The retransmission controller 2004 of the relay server 20 determines whether or not the transmission condition for transmitting the updating result indicating that the reward update is not completed is satisfied (Act S30). The communication controller 2001 of the relay server 20 transmits the updating result to the POS terminal 10 if the transmission condition is satisfied (Act S31).

The display controller 1005 and the printing controller 1006 of the POS terminal 10 output the updating result (Act S32). Specifically, the display controller 1005 of the POS terminal 10 displays that the reward is scheduled to be updated on the first display device 106 and the second display device 107. The printing controller 1006 of the POS terminal 10 enables the printing device 108 to print that the reward is scheduled to be updated.

As described above, each device of the reward system 1 terminates the reward updating process.

Figure 9:
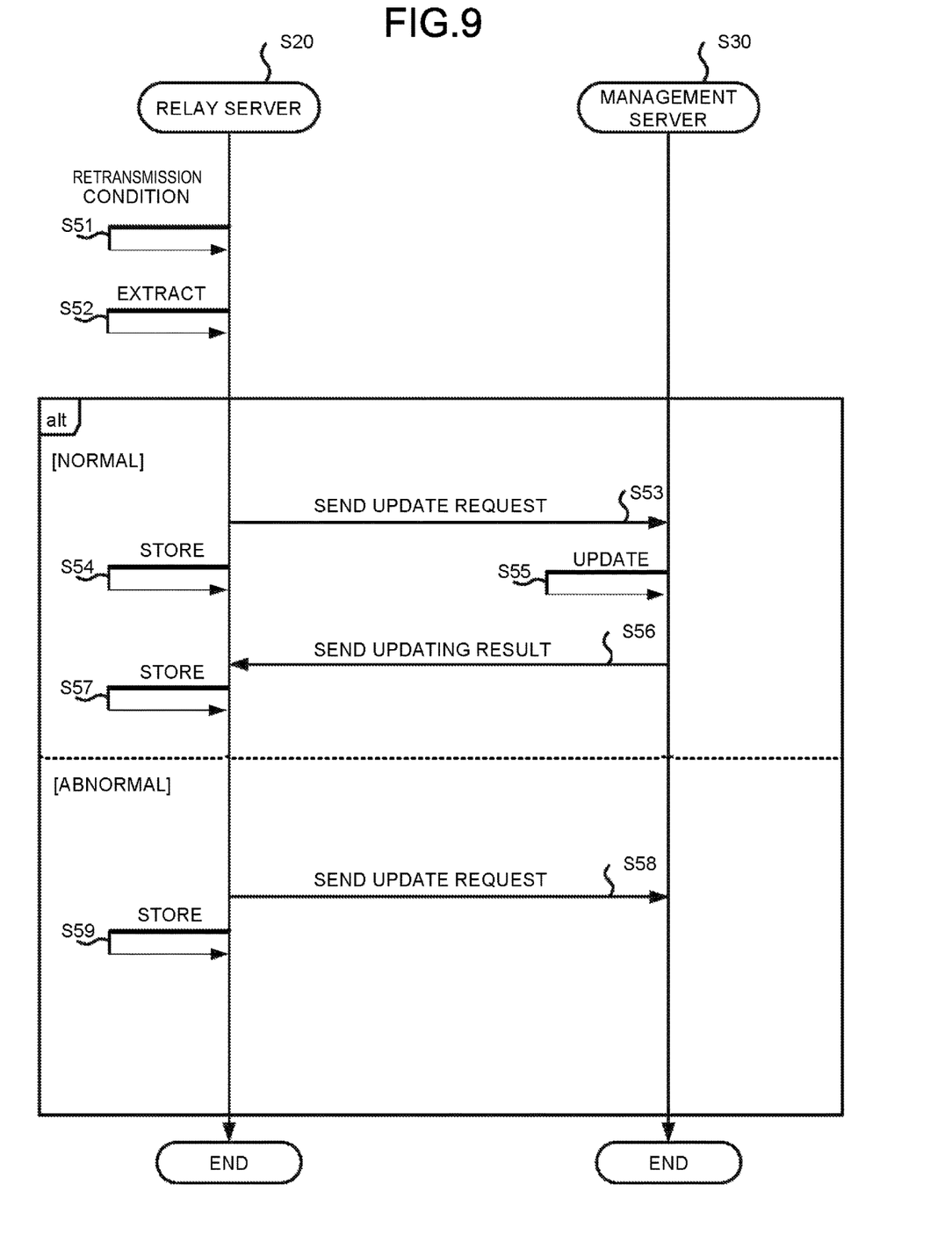
FIG. 9 is a flowchart depicting a retransmission process.

Next, a retransmission process executed by each device of the reward system 1 is described. FIG. 9 is a flowchart illustrating a retransmission process executed by each device of the reward system 1 according to the present embodiment.

The retransmission controller 2004 of the relay server 20 determines whether or not the retransmission condition for retransmitting the update request is satisfied (Act S51). The retransmission controller 2004 of the relay server 20 extracts the update request to be retransmitted from the communication history table 208 (Act S52).

A case in which the reward information in the customer table 308 is normally updated is described in Act S53 to Act S57.

The communication controller 2001 of the relay server 20 transmits the extracted update request to the management server 30 (Act S53). The storage controller 2003 of the relay server 20 stores data indicating that the update request is transmitted in the communication history table 208, and stores the transmitted update request in the update request table 209 (Act S54). Specifically, the storage controller 2003 stores the transaction code, the communication date and time information indicating transmission date and time, and the order information indicating the order 3.

The reward updating section 3003 of the management server 30 updates the reward information associated with the customer code designated by the update request (Act S55).

The communication controller 3001 of the management server 30 transmits the updating result to the relay server 20 (Act S56).

The storage controller 2003 of the relay server 20 stores data indicating that the updating result is received in the communication history table 208 (Act S57). Specifically, the storage controller 2003 stores the transaction code, the communication date and time information indicating reception date and time, and the order information indicating the order 4.

A case in which the updating result indicating that the reward information of the customer table 308 is updated is not received is described in Act S58 to Act S59.

The communication controller 2001 of the relay server 20 transmits the extracted update request to the management server 30 (Act S58). The storage controller 2003 of the relay server 20 stores data indicating that the update request is transmitted in the communication history table 208, and stores the transmitted update request in the update request table 209 (Act S59). Specifically, the storage controller 2003 stores the transaction code, the communication date and time information indicating transmission date and time, and the order information indicating the order 3.

Since the abnormality occurs, the management server 30 does not update the reward information. The management server 30 does not transmit the updating result.

As described above, each device of the reward system 1 terminates the retransmission process.

As described above, according to the reward system 1 of the present embodiment, the relay server 20 stores communication history including the transmission of the update request and the reception of the updating result in the communication history table 208. The relay server 20 periodically extracts the transaction code for which the reception history of the updating result is not stored in the communication history table 208. Then, the relay server 20 transmits the update request specified by the extracted transaction code to the management server 30. In this way, the relay server 20 retransmits the update request to the management server 30 regardless of the operation by the operator who operates the POS terminal 10. Therefore, the relay server 20 can reduce operations relating to rewards.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

In the above embodiment, a case in which the information processing apparatus is applied to the relay server 20 is described as an example; however, the information processing apparatus may be applied to other devices such as the POS terminal 10. All or a part of the functional sections of the relay server 20 may be provided in other devices.

In the above embodiment, a case in which the reward is a point provided in response to the amount of shopping is described as an example, but the reward is not limited to the point. For example, the reward may be a coupon or a novelty.

The programs executed by each device of the foregoing embodiment and the modification may be incorporated into a storage medium (ROM or storage device) of each device in advance to be provided; however, the present invention is not limited to this. The programs may be recorded in a computer-readable recording medium such as a CD-ROM, a FD (Flexible Disk), a CD-R, a DVD (Digital Versatile Disk) and the like in a file of an installable format or an executable format to be provided. Further, the storage medium is not limited to a medium independent from a computer or an embedded system and also contains a storage medium that stores or temporarily stores the programs by downloading the programs transmitted through a LAN or an Internet.

Further, the programs executed by each device of the foregoing embodiment and the modification may be provided by being stored in a computer connected with a network such as the Internet and downloaded via the network, or may be supplied or distributed via the network such as the Internet.

What is claimed is:

1. A relay server for applying rewards in a rewards system that includes the relay server, a point of sale terminal, and a reward management server, the relay server comprising:
   a storage device;
   a communication interface connectable to the point of sale terminal via a first network and the reward management server via a second network that is different from the first network; and
   a processor programmed to:
      upon receipt of an update request for updating an accumulated reward provided to a customer from the point of sale terminal via the first network, control the communication interface to transmit, to the reward management server via the second network, the update request,
      control the storage device to store update request data indicating the update request was transmitted to the reward management server,
      when a reward updated result, which indicates that the accumulated reward provided to the customer was updated, is received from the reward management server via the second network within a predetermined time after the transmission of the updated request:
         control the storage device to store, in correspondence with the updated request data, reward updated data indicating the reward updated result was received from the reward management server, and
         control the communication interface to transmit, to the point of sale terminal via the first network, the reward updated result, and when the reward updated result is not received from the reward management server via the second network within the predetermined time, control the communication interface to transmit, to the point of sale terminal via the first network, a reward update pending result indicating that the update request is pending.

2. The relay server according to claim 1, wherein the processor is further programmed to:
when the predetermined time has elapsed after the transmission of the updated request, determine whether a corresponding reward updated data is stored in the storage device in correspondence with the update request data, and
when the corresponding reward updated data is determined to not be stored in the storage device with the update request data, control the communication interface to retransmit the update request to the reward management server.

3. The relay server according to claim 2, wherein
the processor is further programmed to, when a predetermined condition is satisfied, control the communication interface not to retransmit the update request to the reward management server even when the corresponding reward updated data is determined to not be stored in the storage device with the update request data.

4. The relay server according to claim 3, wherein the predetermined condition is satisfied when the update request is retransmitted a predetermined number of times.

5. The relay server according to claim 1, wherein the updated request includes instructions to add points to an accumulated point total of the customer.

6. The relay server according to claim 1, wherein the updated request includes instructions to subtract points from an accumulated point total of the customer.

7. A method of operating a relay server in a rewards system that includes the relay server, a point of sale terminal, and a reward management server, the method comprising:
receiving, from the point of sale terminal via a first network, an update request for updating an accumulated reward provided to a customer;
transmitting, to the reward management server via a second network that is different from the first network, the update request;
storing update request data indicating the update request was transmitted to the reward management server;
when a reward updated result, which indicates that the accumulated reward provided to the customer was updated, is received from the reward management server via the second network within a predetermined time after the transmission of the updated request:
storing, in correspondence with the updated request data, reward updated data indicating the reward updated result was transmitted from the reward management server, and
transmitting, to the point of sale terminal via the first network, the reward updated result; and
when the reward updated result is not received from the reward management server via the second network within the predetermined time, transmitting, to the point of sale terminal via the first network, a reward update pending result indicating that the update request is pending.

8. The method according to claim 7, further comprising:
when the predetermined time has elapsed after the transmission of the updated request, determining whether a corresponding reward updated data is stored in correspondence with the update request data; and
when the corresponding reward updated data is determined to not be stored with the update request data, retransmitting the update request to the reward management server.

9. The method according to claim 8, wherein
when a predetermined condition is satisfied, the update request is not retransmitted to the reward management server even when the corresponding reward updated data is determined to not be stored in the storage device with the update request data.

10. The method according to claim 9, wherein the predetermined condition is satisfied when the update request is retransmitted a predetermined number of times.

11. The method according to claim 7, wherein the updated request includes instructions to add points to an accumulated point total of the customer.

12. The method according to claim 7, wherein the updated request includes instructions to subtract points from an accumulated point total of the customer.

13. A rewards system comprising:
a point of sale terminal configured to issue an update request for updating an accumulated reward provided to a customer;
a reward management server configured to manage the accumulated reward provided to the customer; and
a relay server including:
a storage device,
a communication interface connectable to the point of sale terminal via a first network and the reward management server via a second network that is different from the first network, and
a processor programmed to:
upon receipt of the update request from the point of sale terminal via the first network, control the communication interface to transmit, to the reward management server via the second network, the update request,
control the storage device to store update request data indicating the update request was transmitted to the reward management server,
when a reward updated result, which indicates that the accumulated reward provided to the customer was updated, is received from the reward management server via the second network within a predetermined time after the transmission of the updated request,
control the storage device to store, in correspondence with the updated request data, reward updated data indicating the reward updated result was received from the reward management server, and
control the communication interface to transmit, to the point of sale terminal via the first network, the reward updated result, and
when the reward updated result is not received from the reward management server via the second network within the predetermined time, control the communication interface to transmit, to the point of sale terminal via the first network, a reward update pending result indicating that the update request is pending.

14. The system according to claim 13, wherein the point of sale terminal is further configured to, upon receipt of the reward updated result from the relay server via the first network, display the reward updated result.

15. The system according to claim 13, wherein the point of sale terminal is further configured to, upon receipt of an input of an identifier of the customer, transmit the update request to the relay server via the first network.

16. The system according to claim 13, wherein the processor is further programmed to:
  when the predetermined time has elapsed after the transmission of the updated request, determine whether a corresponding reward updated data is stored in the storage device in correspondence with the update request data, and
  when the corresponding reward updated data is determined to not be stored in the storage device with the update request data, control the communication interface to retransmit the update request to the reward management server.

17. The system according to claim 16, wherein the processor is further programmed to, when a predetermined condition is satisfied, control the communication interface not to retransmit the update request to the reward management server even when the corresponding reward updated data is determined to not be stored in the storage device with the update request data.

18. The system according to claim 17, wherein the predetermined condition is satisfied when the update request is retransmitted a predetermined number of times.

19. The system according to claim 13, wherein the updated request includes instructions to add points to an accumulated point total of the customer.

20. The system according to claim 13, wherein the updated request includes instructions to subtract points from an accumulated point total of the customer.

* * * * *